US012581004B2

(12) United States Patent
Kim et al.

(10) Patent No.: US 12,581,004 B2
(45) Date of Patent: Mar. 17, 2026

(54) DISPLAY DEVICE AND METHOD OF MANUFACTURING THE SAME

(71) Applicant: Samsung Display Co., LTD., Yongin-si (KR)

(72) Inventors: Byunghoon Kim, Yongin-si (KR); Junwoo You, Yongin-si (KR); Youngdo Kim, Yongin-si (KR); Jeongweon Seo, Yongin-si (KR); Junyoung Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 236 days.

(21) Appl. No.: 18/220,591

(22) Filed: Jul. 11, 2023

(65) Prior Publication Data

US 2024/0106923 A1 Mar. 28, 2024

(30) Foreign Application Priority Data

Sep. 23, 2022 (KR) ........................ 10-2022-0120656

(51) Int. Cl.
*G06F 1/16* (2006.01)
*H04M 1/00* (2006.01)
*H04M 1/02* (2006.01)
(52) U.S. Cl.
CPC ................................ *H04M 1/0264* (2013.01)
(58) Field of Classification Search
CPC .. H04M 1/0264; H04M 1/0266; H10K 50/84; H10K 59/00; H10K 71/00
See application file for complete search history.

(56) References Cited

U.S. PATENT DOCUMENTS

| | | | | |
|---|---|---|---|---|
| 6,034,348 A | | 3/2000 | Kim et al. | |
| 11,363,181 B2 | * | 6/2022 | Chen | H04M 1/0264 |
| 11,385,487 B2 | * | 7/2022 | Zhang | G02F 1/133528 |
| 11,393,415 B2 | * | 7/2022 | Liu | G02F 1/1339 |
| 11,451,651 B2 | * | 9/2022 | Tang | H04M 1/02 |
| 11,510,330 B2 | * | 11/2022 | E | G02B 5/3033 |
| 11,567,352 B2 | * | 1/2023 | Liao | G02F 1/0126 |
| 11,647,106 B2 | * | 5/2023 | Sim | G02B 1/111 |
| | | | | 361/679.01 |
| 11,671,693 B2 | * | 6/2023 | Zhou | G02F 1/1368 |
| | | | | 349/42 |
| 11,782,302 B2 | * | 10/2023 | Hou | G02F 1/133512 |
| | | | | 349/56 |

(Continued)

FOREIGN PATENT DOCUMENTS

| | | |
|---|---|---|
| KR | 100228398 B1 | 11/1999 |
| KR | 1020210104517 A | 8/2021 |

*Primary Examiner* — Rockshana D Chowdhury
(74) *Attorney, Agent, or Firm* — CANTOR COLBURN LLP

(57) ABSTRACT

A display device includes: a display panel and a cover panel disposed under the display panel, including at least one layer for protecting the display panel, and provided with a through-hole and a seating groove defined therein to allow an electronic module to be disposed. The through-hole extends along a thickness direction, the seating groove is connected to an t end of the through-hole and overlaps the through-hole in a plan view, the seating groove has a width greater than a diameter of the through-hole, the seating groove is defined under the through-hole, and the seating groove has a depth from about 10 micrometers to about 100 micrometers.

10 Claims, 10 Drawing Sheets

(56) References Cited

U.S. PATENT DOCUMENTS

| | | | | |
|---|---|---|---|---|
| 11,841,749 | B2 * | 12/2023 | Liu | G02F 1/13312 |
| 11,968,438 | B2 * | 4/2024 | Huang | H04N 23/55 |
| 12,064,945 | B2 * | 8/2024 | Qian | B32B 7/12 |
| 12,128,653 | B2 * | 10/2024 | Kwon | B32B 27/08 |
| 12,132,849 | B2 * | 10/2024 | Jing | G09G 3/3233 |
| 2021/0200020 | A1 * | 7/2021 | Kim | G03B 30/00 |
| 2021/0256882 | A1 | 8/2021 | Kim et al. | |
| 2022/0197339 | A1 * | 6/2022 | Bao | H04N 23/57 |
| 2024/0045134 | A1 * | 2/2024 | Zhang | G02B 6/008 |
| 2024/0129611 | A1 * | 4/2024 | Tang | H04N 23/51 |
| 2025/0211664 | A1 * | 6/2025 | Jin | H04M 1/0264 |

* cited by examiner

DISPLAY DEVICE AND METHOD OF MANUFACTURING THE SAME

This application claims priority to Korean Patent Application No. 10-2022-0120656, filed on Sep. 23, 2022, and all the benefits accruing therefrom under 35 U.S.C. § 119, the content of which in its entirety is herein incorporated by reference.

BACKGROUND

1. Field of Disclosure

The present disclosure relates to a display device and a method of manufacturing the same. More particularly, the present disclosure relates to a display device including a cover panel in which a seating groove is defined and a method of manufacturing the display device.

2. Description of the Related Art

Various types of display devices are being used to provide image information, and the display devices include an electronic module that receives an external signal or provides an output signal to the outside. As an example, the electronic module includes a camera module, and demands for a display device capable of obtaining a high-quality photographed image is increasing.

A way to place the camera module in an area where the image is displayed is being studied to increase the area in which the image is displayed in the display device. Accordingly, there is a need to improve a quality of a photographed image taken through the display area while maintaining a display quality in the display area where the camera module is disposed.

SUMMARY

The present disclosure provides a display device including a cover panel provided with a seating groove in which an electronic module is stably placed.

The present disclosure provides a method of manufacturing the display device including a cover panel in which a seating groove is formed.

Embodiments of the invention provide a display device including a display panel and a cover panel disposed under the display panel, including at least one layer protecting the display panel, and provided with a through-hole and a seating groove defined therein to allow an electronic module to be disposed. The through-hole extends along a thickness direction, the seating groove is connected to a first end of the through-hole and overlaps the through-hole in a plan view, the seating groove has a width greater than a diameter of the through-hole, the seating groove is defined under the through-hole, and the seating groove has a depth from about 10 micrometers to about 100 micrometers.

The electronic module may include: a body portion and a protruding portion protruding from the body portion along the thickness direction and which receives an external signal, and the protruding portion may be inserted into the through-hole.

An upper surface of the protruding portion may be disposed spaced apart from a second end of the through-hole adjacent to the display panel and opposite to the first end by a predetermined distance.

The body portion may be disposed in the seating groove, and a side surface of the body portion is disposed spaced apart from a inner side surface of the cover panel defining the seating groove.

A portion of an upper surface of the body portion may be in contact with a seating surface defined on a lower surface of the cover panel, which defines the seating groove.

The electronic module may include at least one of a camera module, a fingerprint sensor, and a proximity sensor.

A center of the through-hole and a center of the seating groove may be aligned with each other on a straight line extended along the thickness direction.

A minimum distance from a side surface of the cover panel defining the through-hole to a side surface of the cover panel defining the seating groove may be within a range from about 0.5 millimeters (mm) to about 5 mm.

The display panel may include a signal transmission area corresponding to the through-hole and an active area through which an image is displayed, and the signal transmission area may have a pixel resolution lower than a pixel resolution of the active area.

The cover panel may include: a light blocking layer disposed under the display panel and which blocks a light and a cushion layer disposed adjacent to the light blocking layer and which protects the display panel.

A center of the electronic module and a center of the through-hole may be aligned with each other on a straight line extended along the thickness direction.

Embodiments of the invention provide a method of manufacturing a display device. The manufacturing method includes: forming a through-hole penetrating a cover panel disposed under a display panel; and forming a seating groove connected to an end of the through-hole and overlapping the through-hole in the cover panel in a plan view. The cover panel is disposed under the display panel, includes at least one layer for protecting the display panel, and is provided with the through-hole and the seating groove defined therein to allow an electronic module to be disposed, the through-hole extends along a thickness direction, the seating groove has a width greater than a diameter of the through-hole, and the seating groove has a depth from about 10 micrometers to about 100 micrometers.

The forming of the through-hole may include: forming a photoresist layer under the display panel, exposing the photoresist layer using a mask in which a transmissive area and a blocking area surrounding the transmissive area are defined, developing the photoresist layer to form a photoresist pattern corresponding to the transmissive area, forming a portion of the at least one layer of the cover panel on the photoresist pattern, and removing the photoresist pattern and the portion of the at least one layer of the cover panel formed on the photoresist pattern, where the transmissive area may correspond to the through-hole and transmit a light therethrough, and the blocking area may block the light.

The forming of the seating groove may include etching an area of the at least one layer of the cover panel, which corresponds to the seating groove.

The cover panel may have a plurality of layers, inner side surfaces of the plurality of layers of the cover panel defining the through-hole may be aligned with each other, and inner side surfaces of the plurality of the layers of the cover panel defining the seating groove may be aligned with each other.

The photoresist layer may be hardened when exposed to the light.

The photoresist pattern may have a shape in which a width of a second surface disposed far from the display panel is larger than a width of a first surface disposed close to the display panel.

The etching of the area corresponding to the seating groove may be performed using a laser beam.

The laser beam may have a wavelength from about 190 nanometers (nm) to about 10600 nm.

The laser beam may have a pulse period equal to or smaller than about 1 microsecond (μs).

According to the above, the seating groove is defined in the cover panel to stably place the electronic module therein.

In addition, the cover panel which includes at least one layer is etched using the laser beam to define the seating groove, and thus, accumulation of tolerances generated in a process of laminating multiple layers of the cover panel to define the seating groove is effectively prevented.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
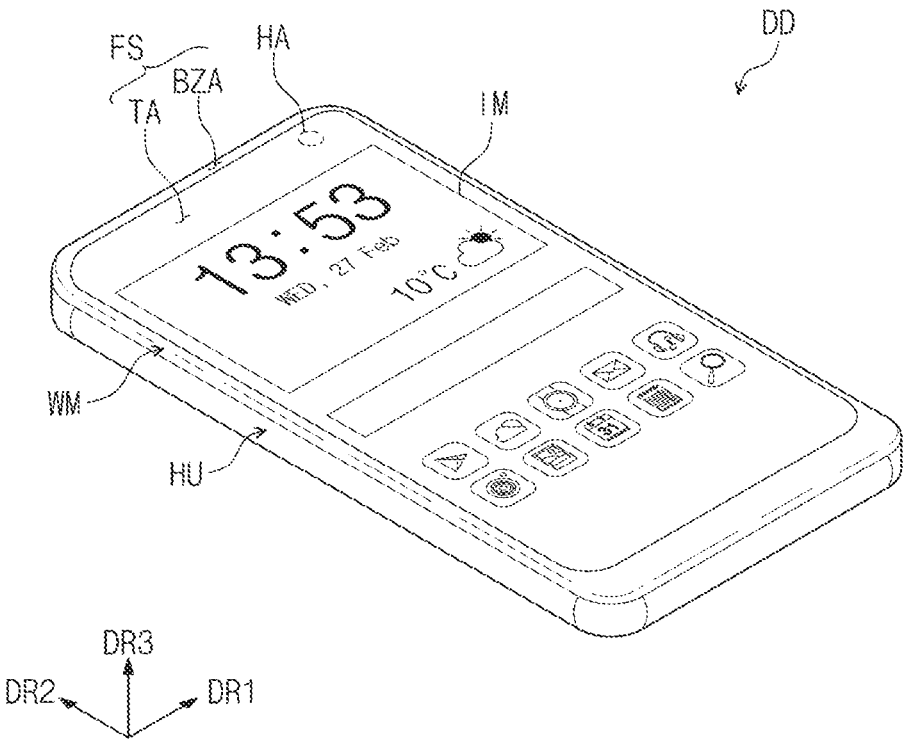
FIG. 1 is a perspective view of a display device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms first, second, etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a display device DD of the present disclosure will be described with reference to accompanying drawings.

Figure 2:
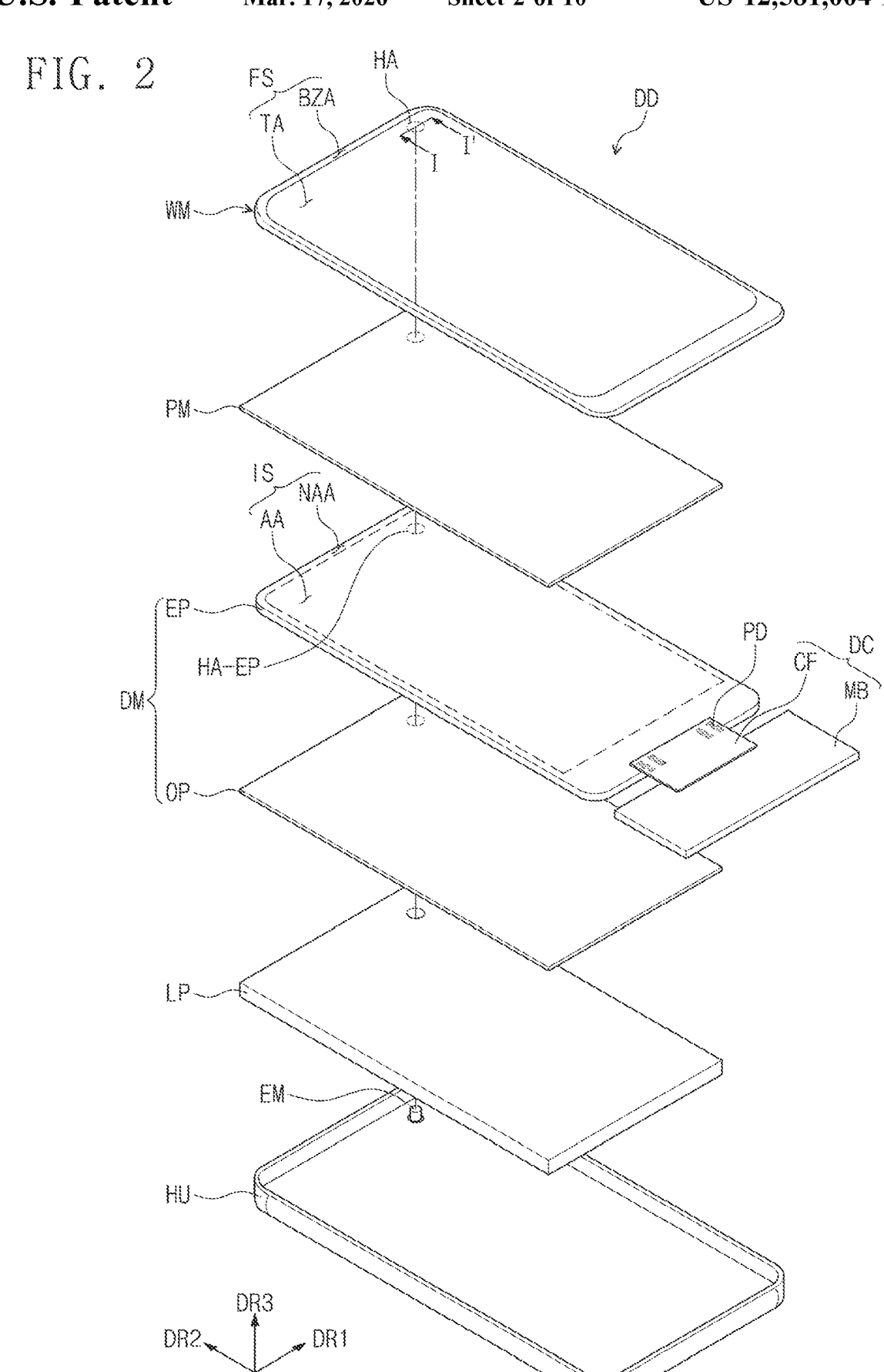
FIG. 2 is an exploded perspective view of a display device according to an embodiment of the present disclosure.

FIG. 1 is a perspective view of the display device DD according to an embodiment of the present disclosure. FIG. 2 is an exploded perspective view of the display device DD according to an embodiment of the present disclosure.

Referring to FIGS. 1 and 2, the display device DD may include a transmissive area TA and a bezel area BZA. The display device DD may display an image IM through the transmissive area TA. FIG. 1 shows a clock widget and application icons as a representative example of the image IM. The transmissive area TA and the bezel area BZA of the display device DD shown in FIG. 1 may correspond to a transmissive area TA and a bezel area BZA of a window member WM.

The display device DD may display the image IM through a display surface, which is substantially parallel to each of a first directional axis DR1 and a second directional axis DR2, toward a third directional axis DR3. The display surface through which the image IM is displayed may correspond to an upper surface of the display device DD and an upper surface FS of the window member WM. In addition, the display device DD may have a three-dimensional shape with a predetermined thickness in the third directional axis DR3 perpendicular to the plane defined by the first directional axis DR1 and the second directional axis DR2.

The transmissive area TA may have a quadrangular shape substantially parallel to the plane defined by the first and second directional axes DR1 and DR2, however, this is merely an example. The transmissive area TA may have a variety of shapes and should not be particularly limited.

The bezel area BZA may be defined adjacent to the transmissive area TA. The bezel area BZA may surround the transmissive area TA, however, this is merely an example. According to an embodiment, the bezel area BZA may be disposed adjacent to only one side of the transmissive area TA or may be omitted.

According to an embodiment, a signal transmission area HA may be defined in the display device DD. The signal transmission area HA may overlap an electronic module EM in a plan view. That is, the signal transmission area HA may be an area where a camera or the like is disposed to photograph an external subject or an area where an optical sensor is disposed to sense a light. That is, the electronic module EM may be a camera module. As used herein, the "plan view" is a view in a thickness direction (i.e., third direction DR3).

As an example, the electronic module EM of the display device DD may be the camera module whose lens is directed toward the upper surface FS to capture images in a self-photography mode. The image IM provided from the display device DD may be displayed at least in a portion surrounding an edge of the signal transmission area HA. However, the electronic module EM should not be limited to the camera module. According to an embodiment, the electronic module EM may include various types of sensors that detect external signals, such as a fingerprint sensor, a proximity sensor, or the like.

In the present embodiment, upper (or front) and lower (or rear) surfaces of each member of the display device DD may be defined with respect to a direction in which the image IM is displayed. The upper and lower surfaces may be opposite to each other in the third directional axis DR3, and a normal line direction of each of the upper and lower surfaces may be substantially parallel to the third directional axis DR3. Directions indicated by the first, second, and third directional axes DR1, DR2, and DR3 may be relative to each other, and thus, the directions indicated by the first, second, and third directional axes DR1, DR2, and DR3 may be changed to other directions. Hereinafter, the first, second, and third directions may be assigned with the same reference numerals as those of the first, second, and third directional axes DR1, DR2, and DR3.

The display device DD may be flexible. The term "flexible" used herein refers to the property of being able to be bent from a structure that is completely bent to a structure that is bent at the scale of a few nanometers. For example, the display device DD may be a curved display device or a foldable display device. According to an embodiment, the display device DD may be rigid.

The display device DD may include a display module DM, a polarizing member PM, the window member WM, a cover panel LP, and a housing HU. The display module DM may include a display panel EP and a protective member OP. In the display device DD, the window member WM may be coupled with the housing HU to form an appearance of the display device DD.

The window member WM may be disposed above the display panel EP and may cover a front surface IS of the display panel EP.

The window member WM may include the upper surface FS exposed to the outside. The upper surface FS of the display device DD may be defined by the upper surface FS of the window member WM. The transmissive area TA of the upper surface FS of the window member WM may be optically transparent. The transmissive area TA may have a shape corresponding to that of an active area AA of the display panel EP. As an example, the transmissive area TA may overlap all or at least a portion of the active area AA. The image IM displayed through the active area AA of the display panel EP may be viewed to a user via the transmissive area TA.

The bezel area BZA may be an area having a relatively lower transmittance as compared with the transmissive area TA in the upper surface FS of the window member WM. The transmissive area TA may have a shape defined by the bezel area BZA. The bezel area BZA may be defined adjacent to the transmissive area TA and may surround the transmissive area TA.

The bezel area BZA may have a predetermined color. When the window member WM is a glass or polymer substrate, the bezel area BZA may be a color layer that is printed or deposited on a surface of the glass or polymer substrate. According to an embodiment, the bezel area BZA may be formed by coloring a corresponding area of the glass or polymer substrate.

The bezel area BZA may cover a peripheral area NAA of the display panel EP to prevent the peripheral area NAA from being viewed from the outside, however, this is merely an example. According to an embodiment of the present disclosure, the bezel area BZA may be omitted from the window member WM.

The signal transmission area HA may be defined in the transmissive area TA of the window member WM. The signal transmission area HA of the window member WM may be defined as the signal transmission area HA of the display device DD.

The display module DM may include the display panel EP disposed under the window member WP and the protective member OP. The display panel EP may include the active area AA through which the image IM is displayed and the peripheral area NAA adjacent to the active area AA. The active area AA may be an area that is activated in response to electrical signals.

The peripheral area NAA may be disposed adjacent to the active area AA. The peripheral area NAA may surround the active area AA. A driving circuit or a driving line to drive the active area AA may be disposed in the peripheral area NAA.

Various signal lines, pads PD, or electronic elements may be arranged in the peripheral area NAA to apply electrical signals to the active area AA. The peripheral area NAA may be covered by the bezel area BZA, and thus, the peripheral area NAA may not be viewed from the outside.

The display panel EP may be assembled to allow the active area AA and the peripheral area NAA to face the window member WM in a flat state, however, this is merely an example. That is, a portion of the peripheral area NAA of the display panel EP may be curved. In this case, the portion of the peripheral area NAA may be curved toward a rear surface of the display device DD, and thus, the bezel area BZA in the front surface of the display device DD may be reduced. According to an embodiment, the display panel EP may be assembled to allow a portion of the active area AA to be curved. Further, the peripheral area NAA may be omitted from the display panel EP according to an embodiment of the present disclosure.

A panel signal transmission area HA-EP may be defined in the display panel EP. The panel signal transmission area HA-EP may be provided in the active area AA. The panel signal transmission area HA-EP may be defined in the active area AA to be spaced apart from the peripheral area NAA. The panel signal transmission area HA-EP may overlap the electronic module EM. In addition, the panel signal transmission area HA-EP may be an area corresponding to a through-hole AH (refer to FIG. 3) described later. The through-hole AH may overlap the active area AA and may be spaced apart from the peripheral area NAA when viewed in the plane (i.e., in a plan view).

The panel signal transmission area HA-EP may have a lower pixel resolution than that of the active area AA of the display panel EP where the image is displayed. Accordingly, the resolution of the image of the panel signal transmission area HA-EP may be lower than the resolution of the image of the active area AA, however, signals applied to the electronic module EM from the outside via the through-hole AH may easily transmit the panel signal transmission area HA-EP.

The display device DD may include a circuit board DC connected to the display panel EP. The circuit board DC may include a flexible board CF and a main board MB. The flexible board CF may include an insulating film and conductive lines mounted on the insulating film. The conductive lines may be connected to the pads PD to electrically connect the circuit board DC and the display panel EP.

According to an embodiment, the flexible board CF may be assembled in a curved state. Accordingly, the main board MB may be disposed on a rear surface of the display panel EP and may be stably accommodated in a space provided by the housing HU. According to an embodiment, the flexible board CF may be omitted, and in this case, the main board MB may be directly connected to the display panel EP.

The main board MB may include signal lines and electronic elements, which are not shown in figures. The electronic elements may be connected to the signal lines and may be electrically connected to the display panel EP. The electronic elements may generate various electrical signals, e.g., a signal used to generate the image IM or a signal used to sense an external input, or may process sensed signals. The main board MB may be provided in plural to correspond to electrical signals generated and processed thereby, however, it should not be limited to a particular embodiment.

Figure 3:
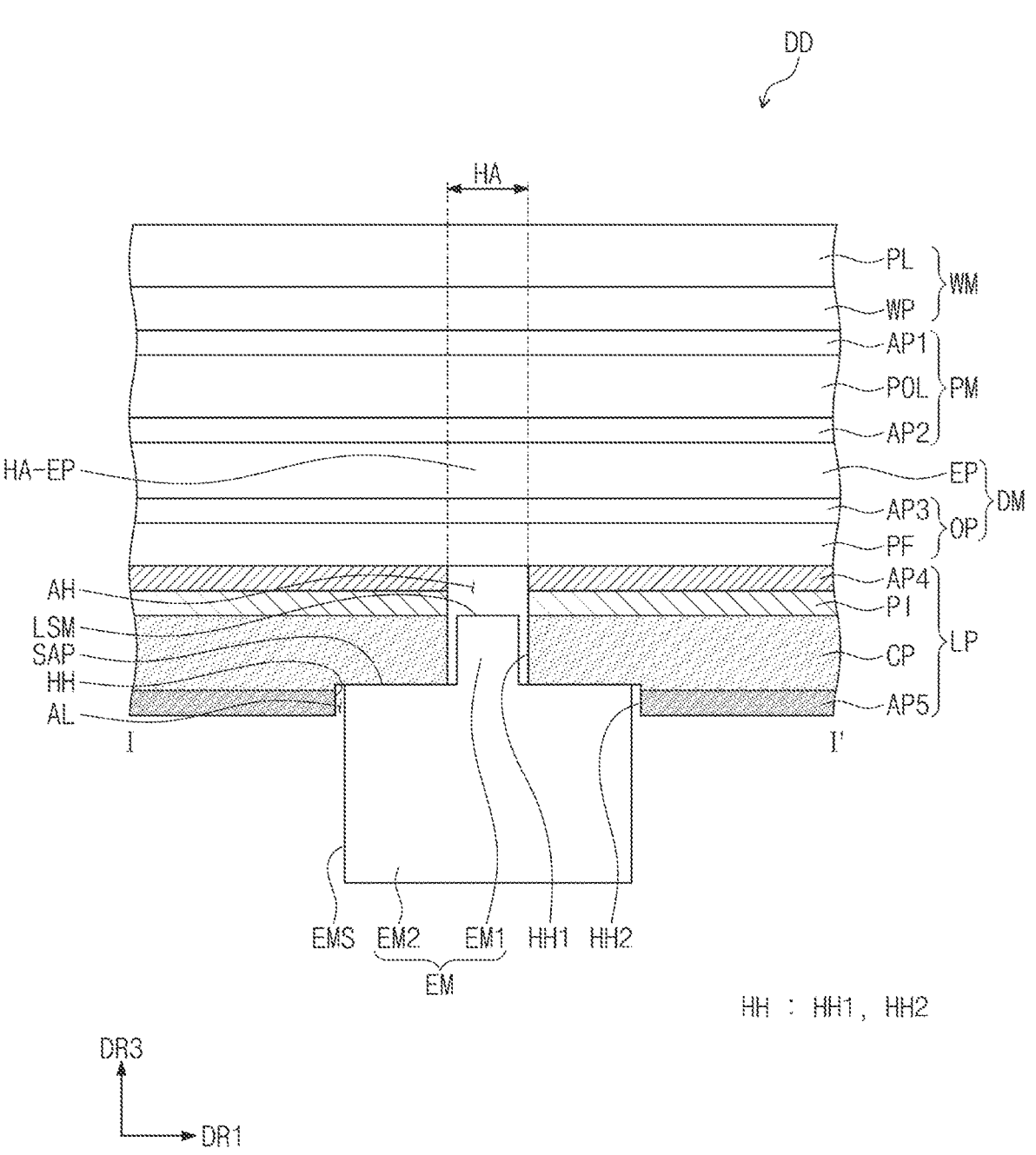
FIG. 3 is a cross-sectional view taken along line I-I' of FIG. 2.

FIG. 3 is a cross-sectional view taken along line I-I' of FIG. 2.

Referring to FIGS. 2 and 3, the polarizing member PM may be disposed between the display panel EP and the window member WM. The polarizing member PM may include a polarizer POL. In addition, the polarizing member PM may further include adhesive layers AP1 and AP2 disposed on at least one of an upper surface and a lower surface of the polarizer POL. Each of the adhesive layers AP1 and AP2 may be an optically transparent adhesive layer, however, the present disclosure should not be limited thereto or thereby. Referring to FIG. 3, a first adhesive layer AP1 may be disposed between the polarizer POL and the window member WM, and a second adhesive layer AP2 may be disposed between the display panel EP and the polarizing member PM.

The window member WM may include a window WP and a protective layer PL disposed on the window WP.

The window WP may be a substrate including an optically transparent insulating material. The window WP may have flexibility. As an example, the window WP may include a polymer film, a polymer substrate, or a thin glass substrate. The window WP may be a substrate with no phase difference or with low phase difference.

The protective layer PL may be disposed on the window WP and may protect the window WP from an external environment. Although not shown in figures, an adhesive layer (not shown) may be further disposed between the window WP and the protective layer PL. The adhesive layer (not shown) may be an optically clear adhesive layer. The protective layer PL may be a layer exposed to the outside among layers included in the display device DD.

The protective member OP may be disposed between display panel EP and the cover panel LP and may protect the display panel EP from impacts from a lower side thereof. The protective member OP may include a polymer film PF and a third adhesive layer AP3 disposed between the display panel EP and the polymer film PF. The polymer film PF may be an optically transparent polyethylene terephthalate ("PET") film. The third adhesive layer AP3 may be an optically transparent adhesive layer.

The cover panel LP may be disposed under the display panel EP and may include at least one layer to protect the display panel EP. The cover panel LP may include a light blocking layer PI and a cushion layer CP. The through-hole AH and a seating groove AL in which the electronic module EM is disposed may be defined in the cover panel LP. As described above, as the seating groove AL is defined in the cover panel LP, a space in which the electronic module EM is stably placed may be provided, and the electronic module EM may be placed closer to the display panel EP by a depth of the seating groove AL in the third direction DR3. Accordingly, a thickness of the display device DD may be reduced.

The light blocking layer PI may be disposed under the display panel EP and may block a transmission of the light. The light blocking layer PI may prevent components disposed under the light blocking layer PI from being viewed from the outside. The light blocking layer PI may include a light blocking material. The light blocking layer PI may include a metal material. The light blocking layer PI may have a thickness equal to or greater than about 0.5 micrometers ($\mu$m) and equal to or smaller than about 2 $\mu$m.

A fourth adhesive layer AP4 may be further disposed on the light blocking layer PI. The protective member OP may be coupled with the light blocking layer PI by the fourth adhesive layer AP4.

The cushion layer CP may be disposed adjacent to the light blocking layer PI and may protect the display panel EP. The cushion layer CP may protect the display panel EP and the electronic module EM from physical impacts applied thereto from the outside of the display device DD. In addition, the cushion layer CP may have a predetermined thickness so as to provide the through-hole AH and the seating groove AL.

The thickness of the cushion layer CP may be equal to or greater than about 50 $\mu$m. As an example, the thickness of the cushion layer CP may be equal to or greater than about 100 $\mu$m in the third direction DR3. The cushion layer CP may be thicker than with the light blocking layer PI. The cushion layer CP may include at least one of an acrylic polymer, a urethane polymer, a silicone polymer, and an imide polymer. The cushion layer CP may have a strength enough to protect the display panel EP and the electronic module EM and to define the through-hole AH and the seating groove AL therein.

A fifth adhesive layer AP5 may be further disposed under the cushion layer CP. Lower components, such as the cushion layer CP and a support plate (not shown), may be coupled with each other by the fifth adhesive layer AP5.

Figure 4:
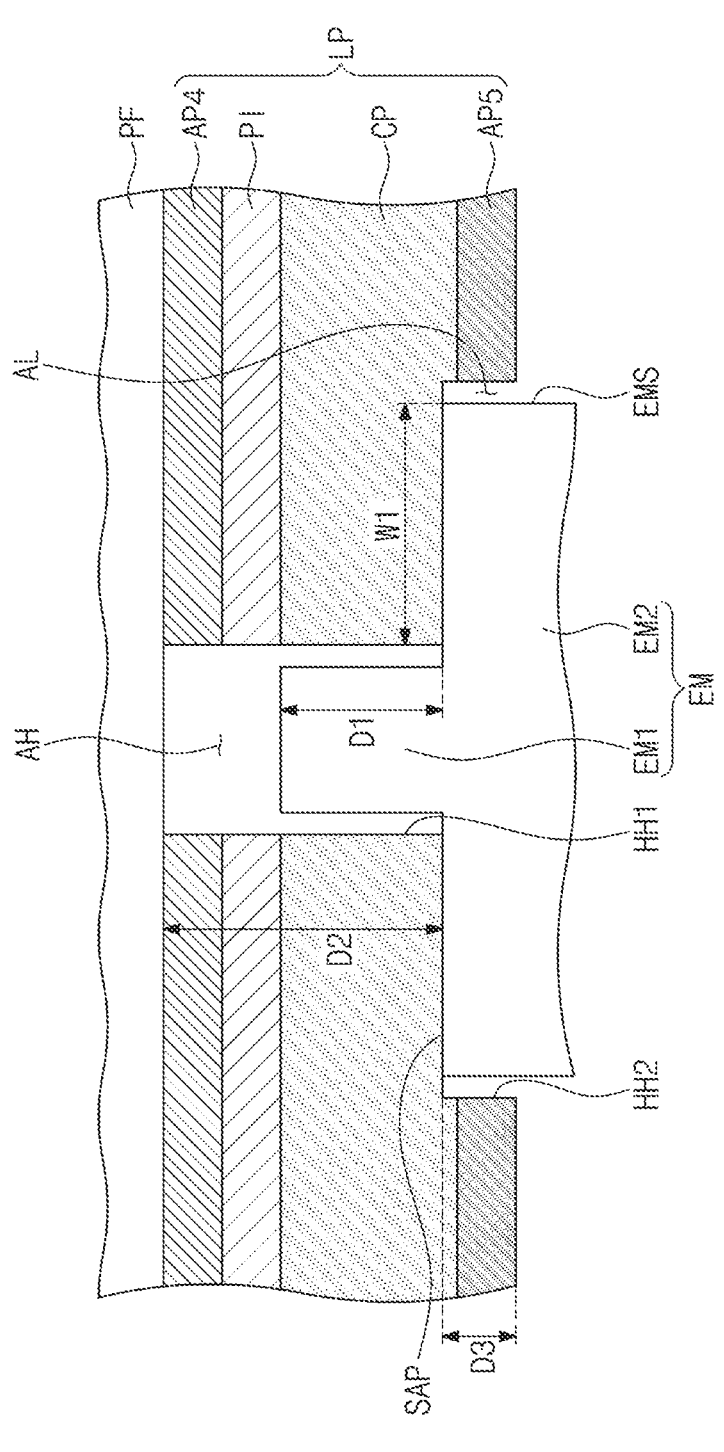
FIG. 4 is a cross-sectional view of an electronic module and a cover panel according to an embodiment of the present disclosure.

FIG. 4 is a cross-sectional view of the electronic module EM and the cover panel LP according to an embodiment of the present disclosure.

Referring to FIGS. 3 and 4, the electronic module EM may include a body portion EM2 and a protruding portion EM1. The electronic module EM may be disposed at a position corresponding to the through-hole AH and the seating groove AL to sense the external signals. An upper surface LSM of the protruding portion EM1 of the electronic module EM may sense the external signals passing through the signal transmission area HA.

The through-hole AH defined in the cover panel LP may extend along the third direction DR3 that is a thickness direction of the cover panel LP. The through-hole AH may have a cylindrical shape, however, the shape of the through-hole AH should not be limited thereto or thereby.

The protruding portion EM1 of the electronic module EM may be inserted into the through-hole AH. A depth D2 of the through-hole AH may be greater than a height D1 of the protruding portion EM1. Hereinafter, among ends of the through-hole AH along the third direction DR3, an end adjacent to the display panel EP is defined as a first end, and an end far from the display panel EP is defined as a second end. The first end may be located at the same position as the lower surface of the polymer film PF in the third direction DR3. When the protruding portion EM1 is inserted into the through-hole AH, the first end of the through-hole AH, which is adjacent to the display panel EP, among ends of the through-hole AH and the upper surface LSM of the protruding portion EM1 may be spaced apart from each other by a predetermined distance. Accordingly, it is prevented that the upper surface LSM of the protruding portion EM1, which receives the external signals, is displaced due to the external impacts and collides with a layer (e.g., the polymer film PF) disposed above the through-hole AH.

A center of the through-hole AH and a center of the seating groove AL may be aligned with each other on a straight line extended along the thickness direction. In this case, the thickness direction may indicate the third direction DR3. As the through-hole AH and the seating groove AL are formed on the straight line, the electronic module EM may be placed symmetrically with respect to a center line extending in the thickness direction in the through-hole AH and the seating groove AL. Accordingly, the stress due to imbalance may be prevented from being intensively generated on one side of the electronic module EM.

The center of the through-hole AH and a center of the electronic module EM may be aligned with each other on the straight line extended along the thickness direction. Accordingly, the external signals may effectively reach the upper surface LSM of the protruding portion EM1 after passing through the signal transmission area HA and the through-hole AH. In addition, a side surface of the protruding portion EM1 is spaced apart from a side surface HH1 of the through-hole AH by a predetermined distance. Accordingly, the side surface of the protruding portion EM1 may be prevented from colliding with the side surface Mil of the through-hole AH and prevented from being damaged. Here, the side surface HH1 of the through-hole AH means an inner side surface of the cover panel LP defining the through-hole AH.

The seating groove AL may be connected to the second end of the through-hole AH and may be defined at the position corresponding to the through-hole AH. The seating groove AL may be defined at a lower side (i.e., the second end) of the through-hole AH, and the seating groove AL may have a width greater than a diameter of the through-hole AH on a plane perpendicular to the thickness direction. The body portion EM2 of the electronic module EM may be disposed in the seating groove AL.

As the seating groove AL is defined in the cover panel LP, the electronic module EM may be placed closer to the display panel EP by a depth D3 of the seating groove AL than when only the through-hole AH is defined. That is, a portion of the electronic module EM, which is to sense the external signals, may be formed as the protruding portion EM1, and the other portion of the electronic module EM may be formed as the body portion EM2. The protruding portion EM1 may be inserted into the through-hole AH, and the body portion EM2 may be disposed in the seating groove AL. Accordingly, the thickness of the display device DD may be reduced.

Accordingly, a step difference may be formed between the through-hole AH and the seating groove AL. When the electronic module EM is provided, an upper surface of the body portion EM2 of the electronic module EM may be covered by a seating surface SAP that is part of the lower surface of the cushion layer CP defining the seating groove AL, and the position in the third direction DR3 of the electronic module EM may be limited. A portion of the upper surface of the body portion EM2 may be in contact with the seating surface SAP of the seating groove AL, and thus, the displacement of the electronic module EM, which is caused by the external impacts, in the third direction DR3 may be reduced.

A minimum distance from the side surface HH1 of the through-hole AH defining the through-hole AH to a side surface HH2 of the seating groove AL defining the seating groove AL may be within a range from about 0.5 mm to about 5 mm. Here, side surface HH2 of the seating groove AL means an inner side surface of the cover panel LP defining the seating groove AL. When the minimum distance is smaller than about 0.5 mm, the size of the electronic module EM placed in the seating groove AL may be limited. In addition, when a distance between a side surface EMS of the electronic module EM and the side surface HH2 of the seating groove AL is reduced, the displacement of the electronic module EM may occur due to the external impacts. As a result, the side surface EMS of the electronic module EM may collide with the side surface HH2 of the seating groove AL, and the electronic module EM may be damaged.

When the minimum distance is greater than about 5 mm, a width of the seating groove AL may become too large when compared with a width of the body portion EM2 of the electronic module EM to inefficiently cause an empty space between the side surface HH2 of the seating groove AL and the side surface EMS of the electronic module EM. In addition, a structural stability of the cover panel LP and a multi-layer structure stacked under the cover panel LP may be deteriorated due to the empty space. Accordingly, it is preferred that the minimum distance from the side surface HH1 of the through-hole AH to the side surface HH2 of the seating groove AL is within the range from about 0.5 mm to about 5 mm.

In the case where the electronic module EM is disposed in the seating groove AL, the side surface of the body portion EM2 may be disposed spaced apart from the side surface HH2 of the seating groove AL by a predetermined distance. Accordingly, even though the displacement of the electronic module EM occurs due to the external impacts, the side surface of the body portion EM2 and the side surface HH2 of the seating groove AL may be disposed spaced apart from each other.

The step difference may be defined on a side surface HH of the cover panel LP. In an embodiment, each of the side surface HH1 of the through-hole AH and the side surface HH2 of the seating groove AL may be provided without having the step difference, and thus, foreign substances may be prevented from entering.

The depth D3 of the seating groove AL may be within a range from about 10 μm to about 100 μm. When the depth D3 of the seating groove AL is smaller than about 10 μm, the electronic module EM may not be stably placed. In addition, the thickness of the display device DD may be reduced by the depth D3 of the seating groove AL, however, the thickness of less than about 10 μm may not provide a meaningful reduction in the thickness to the total thickness of the display device DD.

When the depth D3 of the seating groove AL is greater than about 100 μm, the depth D2 of the through-hole AH may be reduced because the seating groove AL occupies an excessively large portion in the thicknesses of the cover panel LP. Accordingly, the protruding portion EM1 of the electronic module EM may not be inserted into the through-hole AH, or the upper surface LSM of the protruding portion EM1 may be in contact with the first end of the through-hole AH, and the external impacts may be applied to the electronic module EM.

Hereinafter, a method of manufacturing the display device DD will be described.

FIGS. 5A to 5F are cross-sectional views of the method of manufacturing the display device DD according to an embodiment of the present disclosure.

In FIGS. 5A to 5F, the same reference numerals denote the same elements in FIGS. 1 to 4, and thus, detailed descriptions of the same elements will be omitted.

Referring to FIGS. 5A to 5F, the through-hole AH and the seating groove AL may be formed through the cover panel LP using a lift-off process. The lift-off process is simpler than an etching process that is generally used to pattern a material, so the lift-off process has the advantages of simplifying the process, shortening the process time, and lowering the process cost.

Figure 5A:
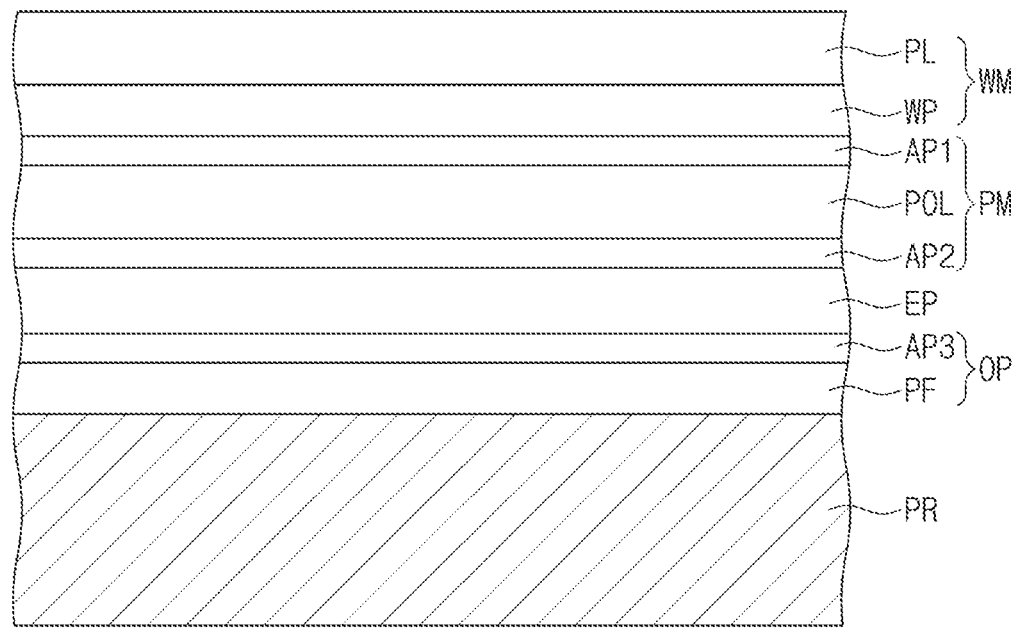
FIGS. 5A to 5F are cross-sectional views of a method of manufacturing a display device according to an embodiment of the present disclosure.
Figure 5A:

Referring to FIG. 5A, a photoresist layer PR may be formed under the display panel EP. The photoresist layer PR used here may be a negative photoresist that hardens when exposed to a light. That is, in the photoresist layer PR of the present disclosure, a portion exposed to the light may be hardened, and a portion not exposed to the light may be dissolved and disappear. The negative photoresist may be more advantageous for the lift-off process since it generates fewer patterning defects than a positive photoresist that dissolves when exposed to the light.

Figure 5B:
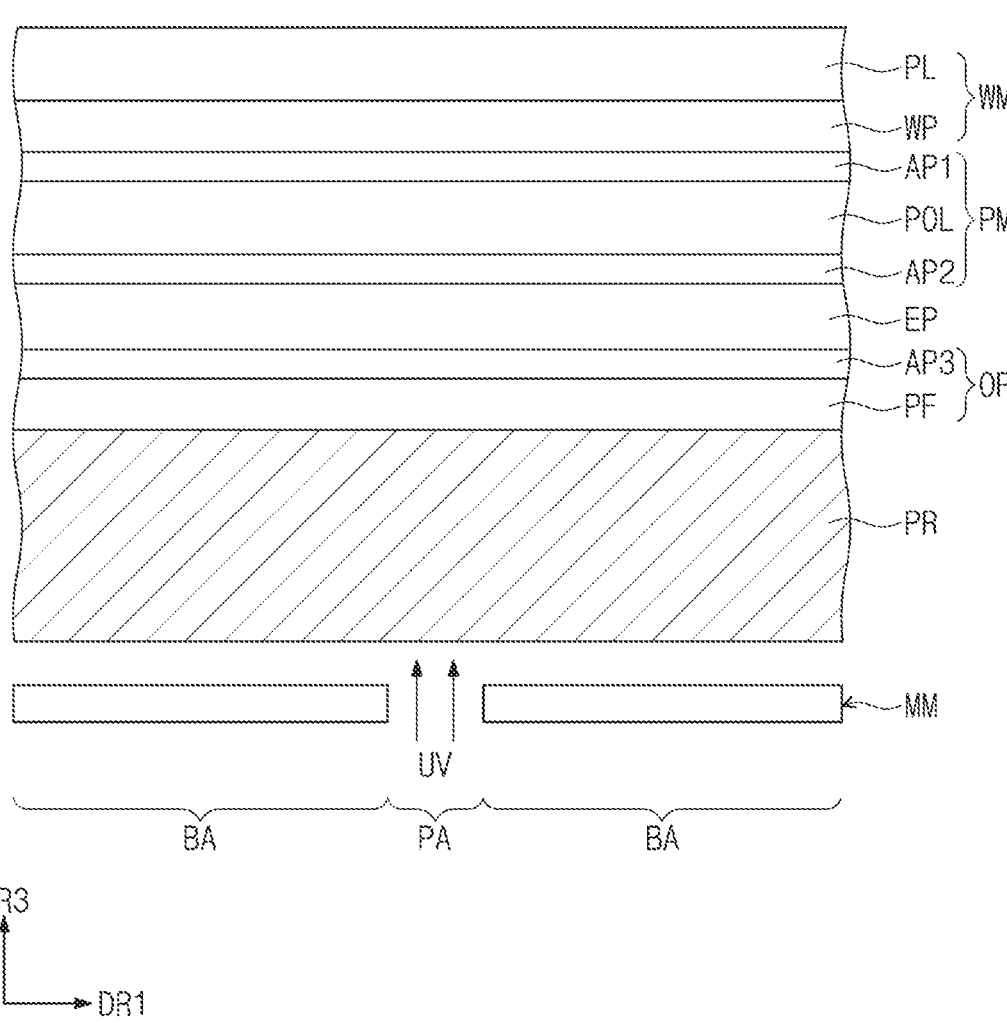

Referring to FIG. 5B, the photoresist layer PR may be exposed to the light using a mask MM in which a transmissive area PA corresponding to the through-hole AH and transmitting the light and a blocking area BA surrounding the transmissive area PA and blocking the light are defined. In this case, since the negative photoresist is used, the photoresist corresponding to the transmissive area PA may be hardened and remain, and the photoresist corresponding to the blocking area BA may be removed. In the exposure process, an ultraviolet light with a short wavelength may be used as a light source to increase a precision of a photoresist pattern PP formed through the exposure process.

Figure 5C:
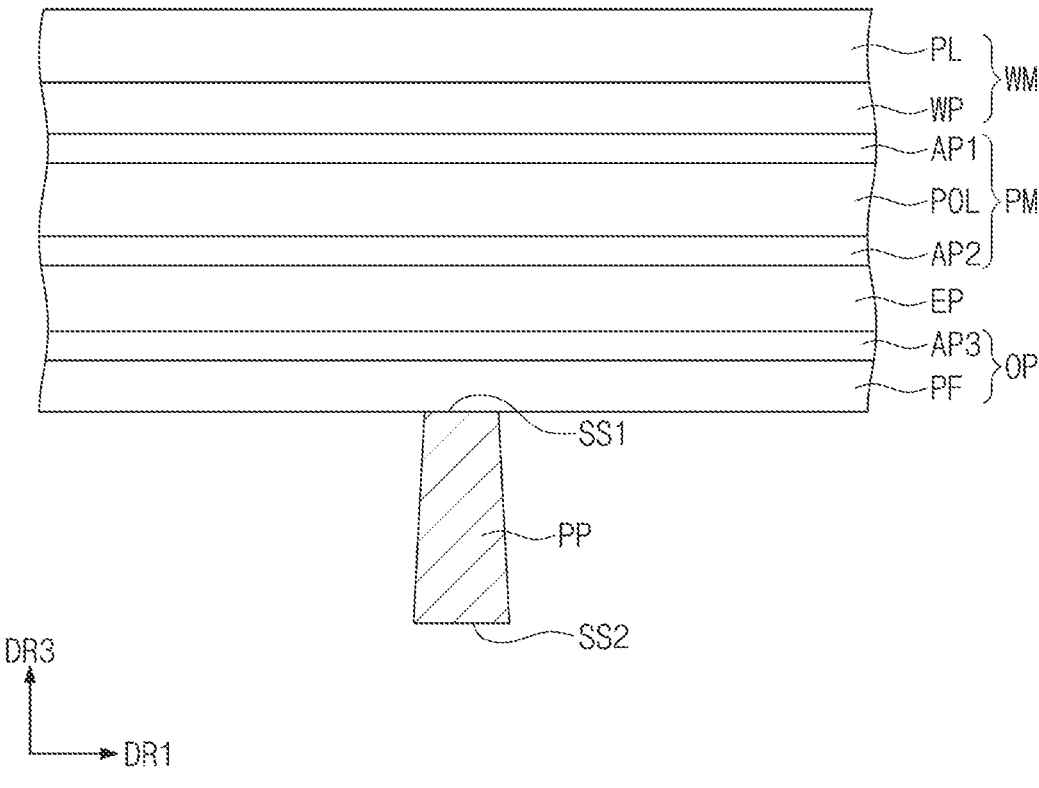

Referring to FIG. 5C, the photoresist layer PR may be developed, and thus, the photoresist pattern PP that is the photoresist layer PR in the area corresponding to the transmissive area PA may be formed. Unwanted portions of the photoresist layer PR divided into an area that receives light and areas that do not receive the light may be selectively removed by using a developer through the exposure process. In the present disclosure, the photoresist layer PR corresponding to the blocking area BA may be removed.

Figure 5D:
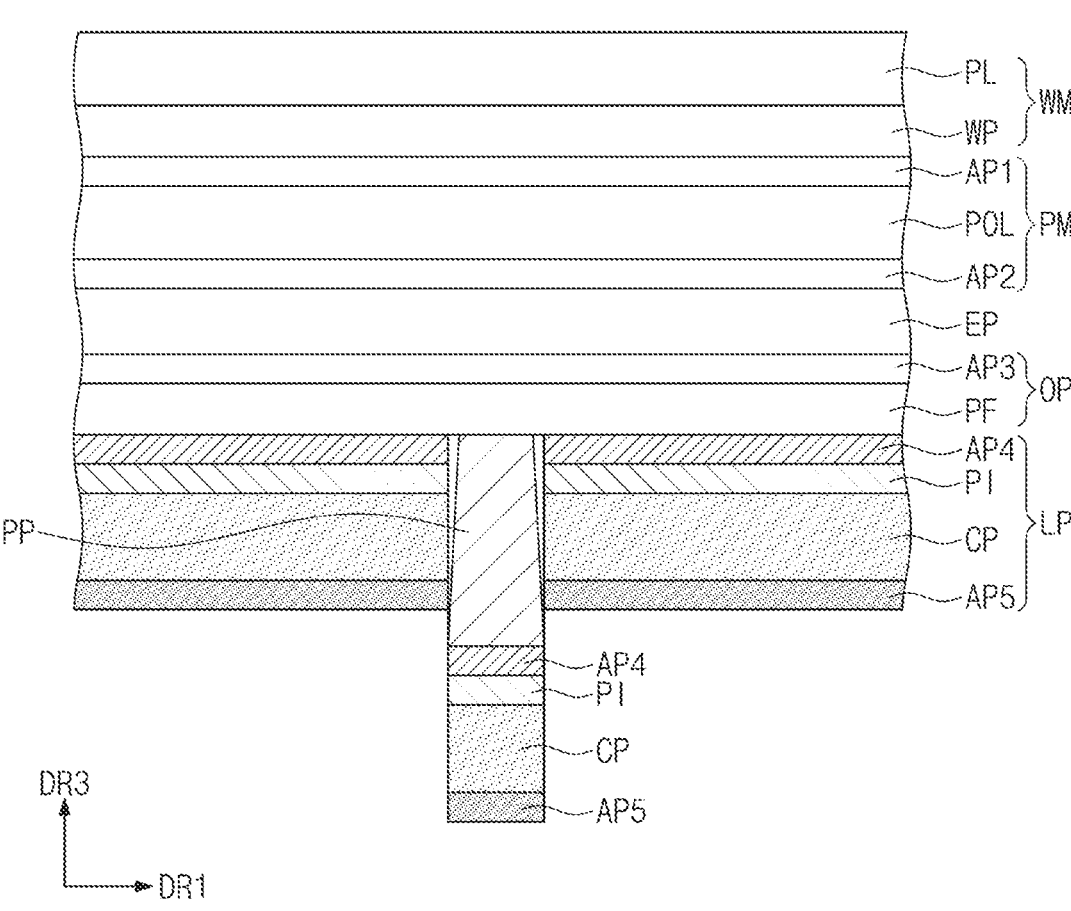

The remaining photoresist pattern PP may have a shape in which a width of a second surface SS2 disposed farther from the display panel EP is larger than that of a first surface SS1 disposed closer to the display panel EP. In this way, when at least one layer of the cover panel LP is deposited as shown in FIG. 5D, a side surface of the cover panel LP and a side surface of the photoresist pattern PP may be spaced apart from each other. Accordingly, when the photoresist pattern PP and the cover panel LP disposed on the photoresist pattern PP are removed, side surfaces of the remaining layers of the cover panel LP may be maintained to be aligned with each other as shown in FIG. 5E.

Referring to FIG. 5D, the cover panel LP may be formed on an external side surface of the photoresist pattern PP and a lower surface of the protective member OP. The fourth adhesive layer AP4, the light blocking layer PI, the cushion layer CP and the fifth adhesive layer AP5 of the cover panel LP may be sequentially formed to form a stack structure. In this case, the cover panel LP may be formed on the photoresist pattern PP in the area where the photoresist pattern PP remains. Accordingly, the cover panel LP formed on the photoresist pattern PP may protrude by the thickness of the photoresist pattern PP.

Figure 5E:
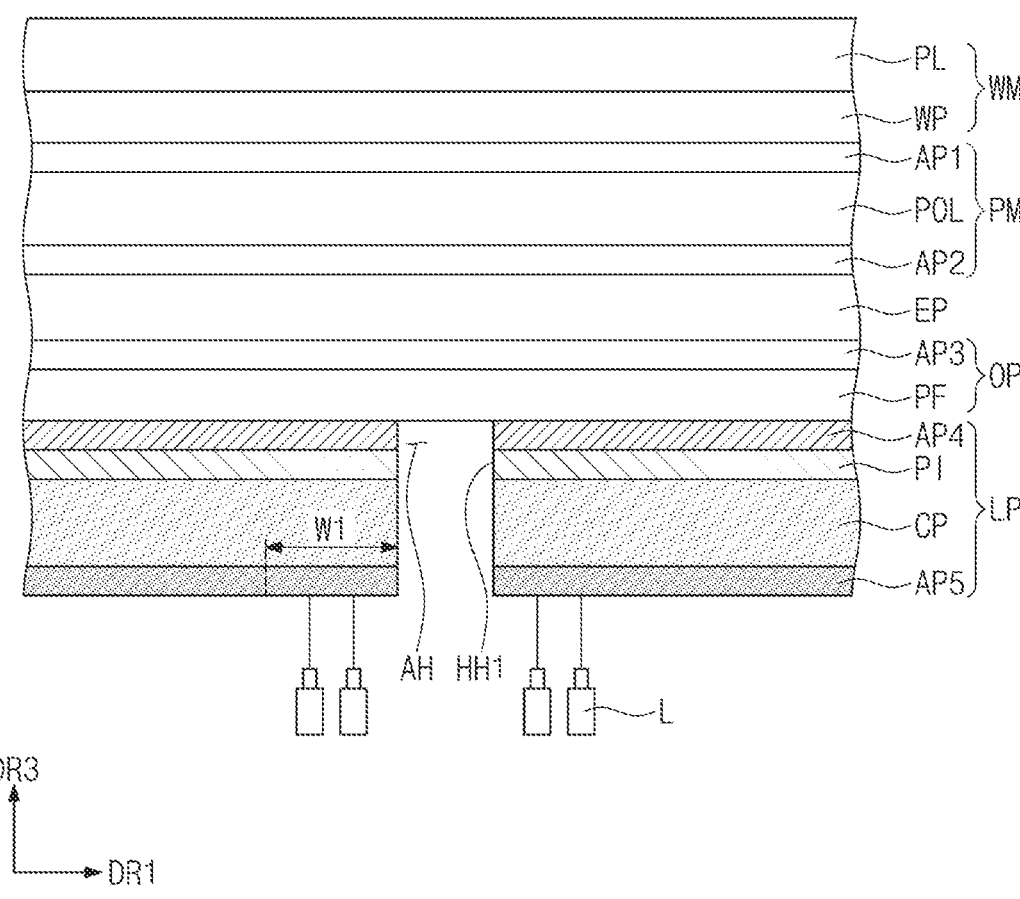

Referring to FIG. 5E, the photoresist pattern PP and the at least one layer of the cover panel LP formed on the photoresist pattern PP may be removed. Since the side surface of the photoresist pattern PP is spaced apart from the side surface of the cover panel LP (refer to FIG. 5D), the side surfaces of the remaining layers of the cover panel LP may be maintained in the aligned state even though the photoresist pattern PP is removed. In this case, the area from which the photoresist pattern PP and the at least one layer of the cover panel LP formed on the photoresist pattern PP are removed may be defined as the through-hole AH.

The method of forming the through-hole AH has been described with reference to FIGS. 5A to 5E, but the through-hole AH may be formed in another method. For example, the cover panel LP is formed by stacking the fourth adhesive layer AP4, the light blocking layer PI, the cushion layer CP, and the fifth adhesive layer AP5 on the lower surface of the protection member OP. Thereafter, a region of the cover panel LP corresponding to the through-hole AH may be laser etched. In this case, a region of the fourth and fifth adhesive layers AP4 and AP5 corresponding to the through-hole AH may be cured to undergo a pretreatment process of weakening adhesive strength.

In addition, areas of portions of the layers disposed at a lower side of the layers of the cover panel LP, which correspond to the seating groove AL, may be etched. As described above, since the seating groove AL is formed after the cover panel LP is laminated, accumulation of tolerances may be reduced and productivity may be improved compared with a case of laminating multiple layers of the cover panel LP excluding the part corresponding to the seating groove AL. Further, since the step difference is not defined on the side surface HH2 of the seating groove AL, the introduction of the foreign substance into the cover panel LP, which is caused by the step difference on the side surface HH2 (refer to FIG. 5F), may be prevented.

When the areas of the cover panel LP corresponding to the seating groove AL are etched, a laser beam L may be used. In this case, the laser beam L may have a wavelength from about 190 nm to about 10600 nm. The laser beam L may have a pulse width (i.e., pulse period) equal to or smaller than about 1 μs.

Figure 5F:
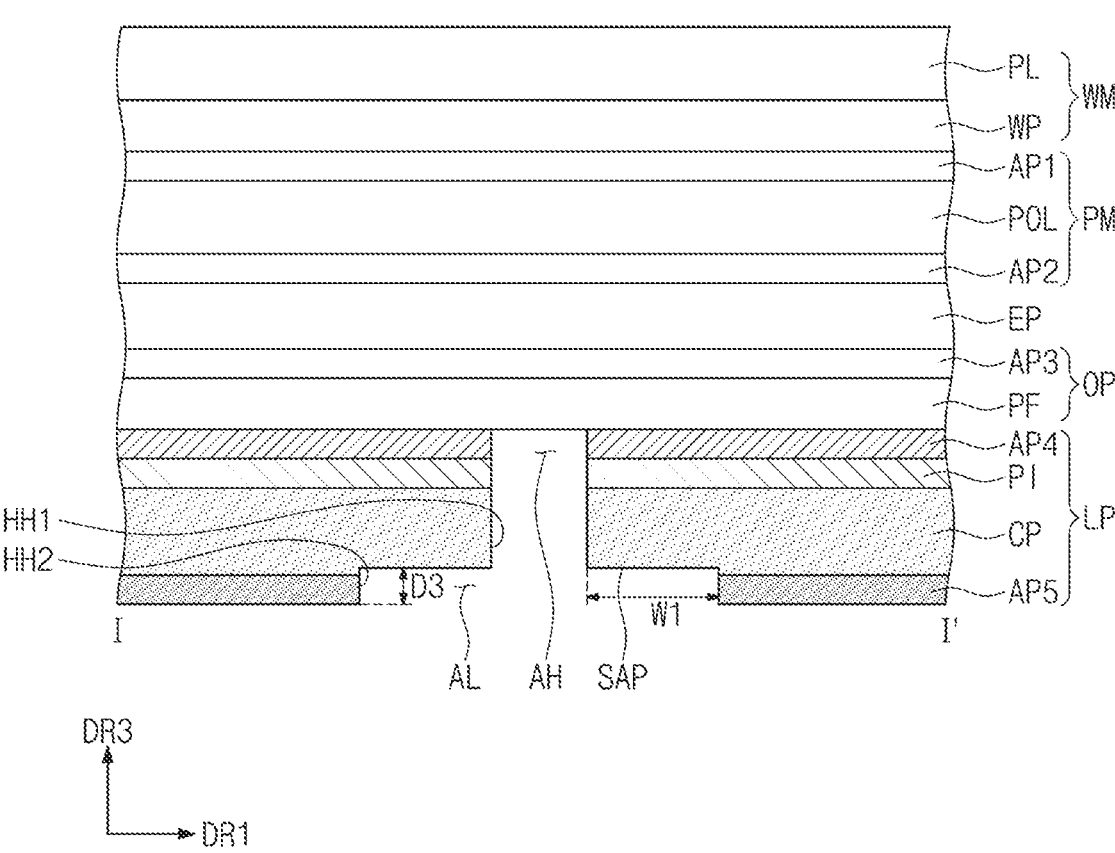

Referring to FIG. 5F, the through-hole AH and the seating groove AL connected to the second end of the through-hole AH and overlapping the through-hole AH in a plan view may be formed in the cover panel LP through the processes shown in FIGS. 5A to 5E. The depth D3 of the seating groove AL may be within the range from about 10 to about 100 μm, and the minimum distance between the side surface HH2 of the seating groove AL and the side surface HH1 of the through-hole AH may be within the range from about 0.5 mm to about 5 mm.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:
1. A display device comprising:
a display panel; and
a cover panel disposed under the display panel, comprising at least one layer for protecting the display panel, and provided with a through-hole and a seating groove defined therein to allow an electronic module to be disposed, wherein the cover panel includes a light blocking layer under the display panel, a cushion layer under the light blocking layer and an adhesive layer under the cushion layer, the through-hole is defined in the light blocking layer and the cushion layer, and the seating groove is defined in the cushion layer and the adhesive layer, wherein the through-hole extends along a thickness direction, the seating groove is connected to a first end of the through-hole and overlaps the through-hole in a plan view, the seating groove has a width greater than a diameter of the through-hole, the seating groove is defined under the through-hole, and the seating groove has a depth from about 10 micrometers to about 100 micrometers.

2. The display device of claim 1, wherein the electronic module comprises:

a body portion; and a protruding portion protruding from the body portion along the thickness direction and which receives an external signal, wherein the protruding portion is inserted into the through-hole.

3. The display device of claim 2, wherein an upper surface of the protruding portion is disposed spaced apart from a second end of the through-hole adjacent to the display panel and opposite to the first end by a predetermined distance.

4. The display device of claim 2, wherein the body portion is disposed in the seating groove, and a side surface of the body portion is disposed spaced apart from an inner side surface of the cover panel defining the seating groove.

5. The display device of claim 2, wherein a portion of an upper surface of the body portion is in contact with a seating surface defined on a lower surface of the cover panel, which defines the seating groove.

6. The display device of claim 1, wherein the electronic module comprises at least one of a camera module, a fingerprint sensor, and a proximity sensor.

7. The display device of claim 1, wherein a center of the through-hole and a center of the seating groove are aligned with each other on a straight line extended along the thickness direction.

8. The display device of claim 1, wherein a minimum distance from a side surface of the cover panel defining the through-hole to a side surface of the cover panel defining the seating groove is within a range from about 0.5 millimeters (mm) to about 5 mm.

9. The display device of claim 1, wherein the display panel comprises a signal transmission area corresponding to the through-hole and an active area through which an image is displayed, and the signal transmission area has a pixel resolution lower than a pixel resolution of the active area.

10. The display device of claim 1, wherein a center of the electronic module and a center of the through-hole are aligned with each other on a straight line extended along the thickness direction.

\* \* \* \* \*